(12) United States Patent
Minematsu et al.

(10) Patent No.: US 7,162,585 B2
(45) Date of Patent: Jan. 9, 2007

(54) SEMICONDUCTOR MEMORY DEVICE STORING PART OF PROGRAM DESIGNATED BY PROGRAMMER, AND SOFTWARE DEVELOPMENT APPARATUS FOR SYSTEM USING THE SAME

(75) Inventors: Isao Minematsu, Hyogo (JP); Hisakazu Sato, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 325 days.

(21) Appl. No.: 10/686,724

(22) Filed: Oct. 17, 2003

(65) Prior Publication Data

US 2004/0133732 A1 Jul. 8, 2004

(30) Foreign Application Priority Data

Jan. 8, 2003 (JP) .............................. 2003-002233

(51) Int. Cl.
G06F 9/00 (2006.01)
(52) U.S. Cl. .................. 711/125; 711/100; 711/154; 712/205
(58) Field of Classification Search .................. None
See application file for complete search history.

(56) References Cited

U.S. PATENT DOCUMENTS 5,381,533 A  1/1995  Peleg et al.
6,684,319 B1 *  1/2004  Mohamed et al. ............. 712/24
2004/0128476 A1 *  7/2004  Nuckolls et al. ............. 712/206

FOREIGN PATENT DOCUMENTS

JP  9-319657  12/1997
JP  10-340228  12/1998

OTHER PUBLICATIONS

"Efficient Utilization of Scratch-Pad Memory in Embedded Processor Applications", by Preeti Ranjan Panda et al., European Design and Test Conference, Mar. 1997.

* cited by examiner

Primary Examiner—Mano Padmanabhan
Assistant Examiner—Jasmine Song
(74) Attorney, Agent, or Firm—McDermott Will & Emery LLP

(57) ABSTRACT

An address range of consecutive instructions stored in an instruction buffer is set in an address table. A determination unit determines whether an instruction address outputted from a CPU core falls within the address range set in the address table. A selector selectively outputs an instruction code stored in the instruction buffer and an instruction code stored in an instruction cache in accordance with a determination result of the determination unit. Therefore, in the case where the CPU core fetches an instruction stored in the instruction buffer, an access cycle is guaranteed and an operation of the instruction cache is stopped, thereby making it possible to improve power efficiency.

6 Claims, 15 Drawing Sheets

FIG.7A

```
.text
_func1:
_stash1_top:
 ld  r1, @r14+
 ld  r2, @r14+
_stash1_end:
 add r1, r2
(THE REST IS OMITTED)
```

```
.section _stash_at, "a"
.word 0x00000264, 0x0000026c
```

FIG.7D

```
Disassembly of section .stash_at:

40001000 <.stash_at>:
    0: 00 00 02 64      subv r0,r0→  cmpeq r2,r4
    4: 00 00 02 6c      subv r0,r0→  cmpeq r2,r12
Disassembly of section .stash_buf:

40002000 <.stash_buf>:
    0: 21 ee 22 ee      ld r1,@lr+→  ld r2,@lr+
```

```
for(i= 0;; i++){
#pragma _stash1_top          MACRO_A(i, j);
    if( j > INT_MAX)
        break;
}
#pragma_stash1_end
    return( j );
```

| ADDRESS | |
|---|---|
| 0x4000_0000 | STASH_CNT |
| 0x4000_0004 | STASH_STS |
| | (USE PROHIBITED REGION) |
| 0x4000_1000 ∫ 0x4000_1FFF | ADDRESS TABLE 1 |
| 0x4000_2000 ∫ 0x4000_2FFF | ADDRESS TABLE 2 |
| 0x4000_3000 ∫ 0x4000_3FFF | INSTRUCTION BUFFER 1 |
| 0x4000_4000 ∫ 0x4000_4FFF | INSTRUCTION BUFFER 2 |

SEMICONDUCTOR MEMORY DEVICE STORING PART OF PROGRAM DESIGNATED BY PROGRAMMER, AND SOFTWARE DEVELOPMENT APPARATUS FOR SYSTEM USING THE SAME

BACKGROUND OF THE INVENTION

1. Field of the Invention

The present invention relates to a semiconductor memory device used together with a CPU (Central Processing Unit), and more particularly to a semiconductor memory device storing part of a program designated by a programmer and outputting an instruction code when the CPU fetches the instruction, and a software development apparatus for a system using the same.

2. Description of the Background Art

Recently, as the processing speed of CPU has been increasingly accelerated, a CPU mounting a cache memory thereon has been actively developed. Generally, a cache memory is a small-sized, high-rate memory device which is connected between the CPU and a main memory and which temporarily holds the content of the main memory recently used by the CPU. Caches are classified into three types: "instruction cache" when a content to be held is an instruction from the CPU; "data cache" when the content is data; and "unified cache" when the content is both the instruction and the data.

The cache has a mechanism which utilizes a feature that the CPU locally accesses a memory, and is well known that the cache generally has an effect of improving the processing performance of the CPU. The effect is, however, dependent on a program performed by the CPU. For example, if a program performed by the CPU has a characteristics that there is no ordinality in memory access, cache hit rate lowers and the cache cannot improve the processing performance of the CPU.

In addition, since the cache inherently has a mechanism of detecting the consistency of a reference address outputted from the CPU with the content of the cache, the power consumption of the cache tends to increase. Due to this, even if a cache is introduced to the CPU, CPU power efficiency (processing performance/power consumption) does not always improve.

Furthermore, the content of the cache depends on the program performing history of the CPU. For this reason, even if the CPU accesses the same address, the CPU sometimes hits the cache and sometimes fails to hit the cache. Access cycles for instructions and data cannot be guaranteed. As a result, it is difficult for a system which uses a cache to optimize software having high real-time characteristics.

In order to solve these problems, the following techniques are disclosed.

1. Japanese Patent Laying-Open No. 10-340226
2. Japanese Patent Laying-Open No. 9-319657
3. U.S. Pat. No. 5,381,533
4. P. R. Panda et al., "Efficient Utilization of Scratch-Pad Memory in Embedded Processor Applications", European Design and Test Conference, March 1997

According to Prior Art 1, a tag memory is divided to a first tag memory which includes a common bit group through respective ways in an address tag, and a second tag memory which includes individual bit groups for respective ways. An address indicated from a data processor is divided and the divided addresses are compared with each other for each of the first and second tag memories, thereby decreasing the power consumption of a microprocessor without lowering hit rate. Although Prior Art 1 contributes to improving power efficiency, it does not contribute to improving the performance of the CPU when the CPU performs a program.

According to Prior Art 2, an instruction cache is constituted of one line and one instruction, and an instruction stream buffer is provided between the instruction cache and a main memory. The instruction stream buffer is integer-multiple times as large as the cache line, and consecutive variable-length instructions read from the main memory can be written to the instruction stream buffer. Output to the instruction cache can be performed on each cache line unit. Although Prior Art 2 can eliminate useless instruction reading, it cannot improve power efficiency and cannot guarantee an instruction access cycle.

According to Prior Art 3, each of instruction trace segments includes instruction blocks, the first instruction in each block becomes the next instruction to a branch instruction, and the blocks are arranged so that the last instruction of each block becomes a branch instruction. It is thereby possible to improve hit rate and power efficiency. However, similarly to Prior Art 2, an instruction access cycle and a data access cycle cannot be guaranteed.

According to Prior Art 4, a small-sized, high-rate scratch-pad memory (hereinafter, abbreviated as "SPM") is arranged in an address space different from a main memory. A programmer designates an instruction or data to be frequently accessed, and the designated instruction or data is held in SPM. As a result, the number of access cycles to SPM is guaranteed and a consistency detection function which is normally included in a cache becomes unnecessary, thus making it possible to decrease power consumption. Generally, however, the SPM is used as a data memory, i.e., used in place of a data cache, and difficult to mount as an instruction memory.

SUMMARY OF THE INVENTION

It is an object of the present invention to provide a semiconductor memory device capable of guarantee of an access cycle during instruction fetch and capable of improving the power efficiency of a processor system, and a software development apparatus capable of efficiently developing software for a processor system which includes the semiconductor memory device.

According to one aspect of the present invention, a semiconductor memory device connected between a processor and an instruction cache, includes: an instruction buffer storing part of consecutive instructions performed by the processor; an address table setting therein an address range of the consecutive instructions stored in the instruction buffer; a determination unit determining whether an instruction address outputted from the processor fall within the address range set in the address table; and a selector selectively outputting an instruction code stored in the instruction buffer and an instruction code stored in the instruction cache in accordance with a determination result of the determination unit.

The selector selectively outputs the instruction code stored in the instruction buffer and that stored in the instruction cache in accordance with the determination result of the determination unit. Therefore, in the case where the processor fetches an instruction stored in the instruction buffer, an access cycle is guaranteed to thereby make it possible to facilitate the development of software having high real-time characteristic. In addition, since the operation of the instruction cache is stopped during the instruction fetch, it is possible to improve power efficiency.

According to another aspect of the present invention, a software development apparatus for a processor system including a semiconductor memory device connected between a processor and an instruction cache and storing part of consecutive instructions performed by the processor, includes: an extraction section extracting the consecutive instructions arranged in the semiconductor memory device from a source file; an acquisition section acquiring address information on addresses at which the consecutive instructions extracted by the extraction section are originally mapped; a reformatting section reformatting the address information acquired by the acquisition section into a form compatible with the source file; and a generation section generating a load module from the source file, the consecutive instructions extracted by the extraction section, and the address information reformatted by the reformatting section.

The extraction section extracts the consecutive instructions arranged in the semiconductor memory device from the source file. The generation section generates the load module from the source file, the consecutive instructions extracted by the extraction section, and the address information reformatted by the reformatting section. Therefore, a programmer can easily develop software for a processor system including the semiconductor memory device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7A shows part of a program performed by the CPU core, FIG. 7B shows one example of a program extracted by an instruction extraction section, FIG. 7C shows address information reformatted by an address information reformatting section, and FIG. 7D shows part of the disassemble result of a module linked by a linker;

DESCRIPTION OF THE PREFERRED EMBODIMENTS

First Embodiment

Figure 1:
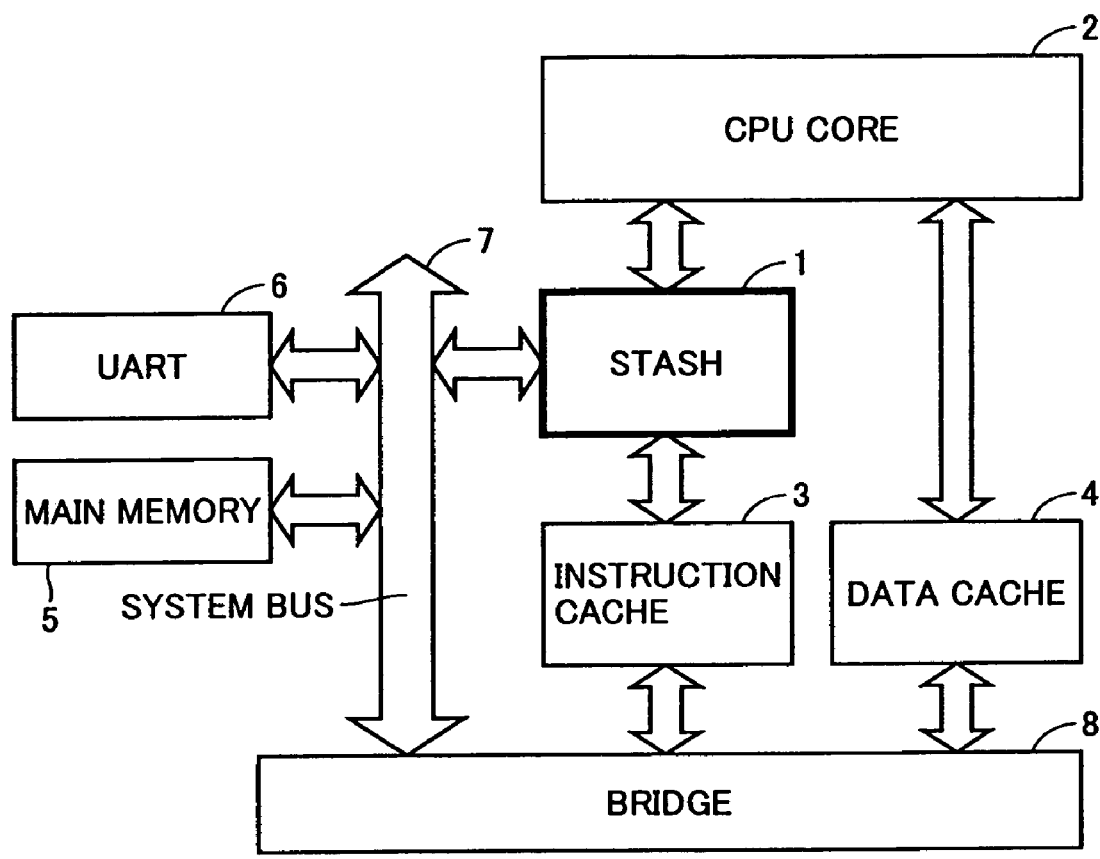
FIG. 1 is a block diagram showing a configuration example of a processor system which employs a semiconductor memory device according to a first embodiment of the present invention.

FIG. 1 is a block diagram showing a configuration example of a processor system which employs a semiconductor memory device according to a first embodiment of the present invention. This processor system includes a semiconductor memory device (expressed as "STASH" in FIG. 1) 1, a CPU core 2, an instruction cache 3, a data cache 4, a main memory 5, and a USART (Universal Synchronous and Asynchronous Receiver-Transmitter) 6.

Semiconductor memory device 1 is connected between CPU core 2 and instruction cache 3, and is also connected to a system bus 7. CPU core 2 can directly fetch an instruction from semiconductor memory device 1, and can also fetch an instruction from instruction cache 3 through semiconductor memory device 1. CPU core 2 can read and write data from and to data cache 4. CPU core 2 can access semiconductor memory device 1 through system bus 7.

Instruction cache 3 and data cache 4 are connected to system bus 7 through a bridge 8. In addition, main memory 5 and various types of functional blocks such as USART 6 are connected to system bus 7. In FIG. 1, USART 6 is illustrated to represent the various functional blocks. In FIG. 1, all functional blocks are realized within a single LSI (Large Scale Integrated Circuit) chip. Alternatively, part of the function of the block may be realized by separate LSI chip or semiconductor memory device 1 may be directly connected to bridge 8.

Figure 2:
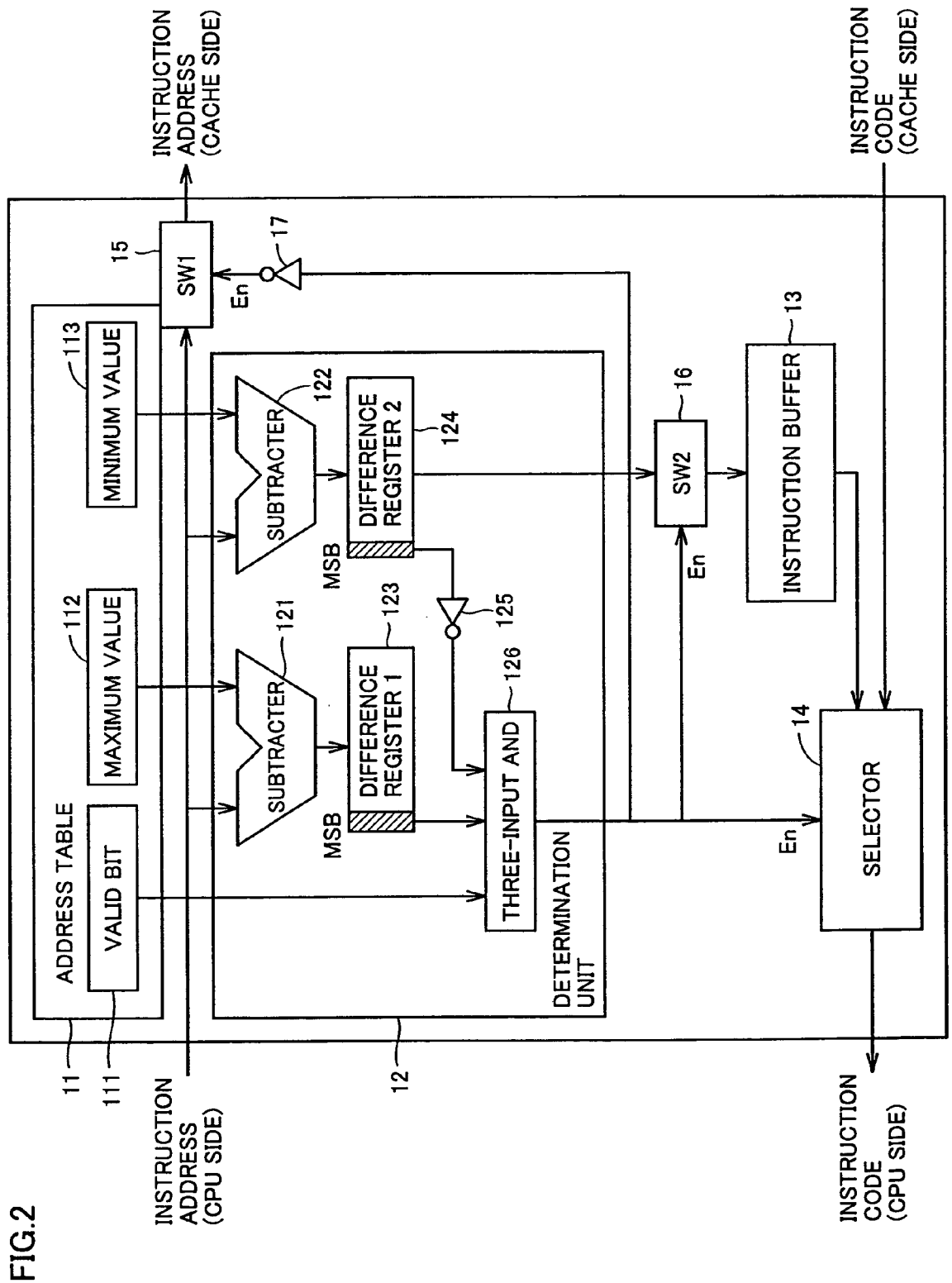
FIG. 2 is a block diagram showing an internal configuration of the semiconductor memory device according to the first embodiment of the present invention.

FIG. 2 is a block diagram showing an internal configuration of semiconductor memory device 1 according to the first embodiment of the present invention. Semiconductor memory device 1 includes an address table 11, a determination unit 12, an instruction buffer 13, a selector 14 which selectively outputs an instruction code outputted from instruction buffer 13 and an instruction code outputted from instruction cache 3, a switch 1 (hereinafter, abbreviated as "SW1") 15, a switch 2 (hereinafter, abbreviated as "SW2") 16, and an inverter 17.

Instruction buffer 13 is a randomly accessible memory device, and stores part of consecutive instructions performed by CPU core 2.

Address table 11 includes a valid bit storage region 111, a maximum address storage region 112 and a minimum address storage region 113. Maximum address region 112 stores the maximum value of addresses corresponding to consecutive instructions stored in instruction buffer 13. Minimum address region 113 stores the minimum value of addresses corresponding to the consecutive instructions stored in instruction buffer 13. Valid bit region 111 stores a bit indicating whether address information stored in address table 11 is valid or invalid.

Determination unit 12 determines whether to select the instruction code outputted from instruction buffer 13 or the instruction code outputted from instruction cache 3 while referring to addresses stored in address table 11 and the address outputted from CPU core 2. Determination unit 12 includes subtracters 121 and 122, a difference register 1 (123) which stores the subtraction result of subtracter 121, a difference register 2 (124) which stores the subtraction result of subtracter 122, an inverter 125, and a three-input AND circuit 126.

Subtracter 121 subtracts the maximum address stored in region 112 from an address outputted from CPU core 2, and stores the subtraction result in difference register 1 (123). Subtracter 122 subtracts the minimum address stored in region 113 from the address outputted from CPU core 2, and stores the subtraction result in difference register 2 (124).

AND circuit 126 performs an AND operation among the value of valid bit region 111, the sign bit (MSB: Most Significant Bit) of difference register 1 (123), and the inverted value of the sign bit of difference register 2 (124), thereby determining whether or not the addresses outputted from CPU core 2 fall within a predetermined range. Namely, in the case where "minimum address 113≦instruction address", "instruction address<maximum address 112" and "valid bit=1", then AND circuit 126 determines instruction address hit and outputs high level (hereinafter, abbreviated as "H level").

In the case of determining that the instruction address hits, AND circuit 126 outputs H level, whereby selector 14 is made select the instruction code outputted from instruction buffer 13, and SW2 (16) is turned on to output the value (the address of instruction buffer 13) from difference register 2 (124) to instruction buffer 13. At the same time, since address output to instruction cache 3 is unnecessary, SW1 (15) is turned off.

In the case of determining the instruction address fails to hit, AND circuit 126 outputs low level (hereinafter, abbreviated as "L level"), whereby selector 14 is made select the instruction code outputted from instruction cache 3. At the same time, since address output to instruction buffer 13 is unnecessary, SW2 (16) is turned off and SW1 (15) is turned on to output the instruction address to instruction cache 3.

Figure 3:
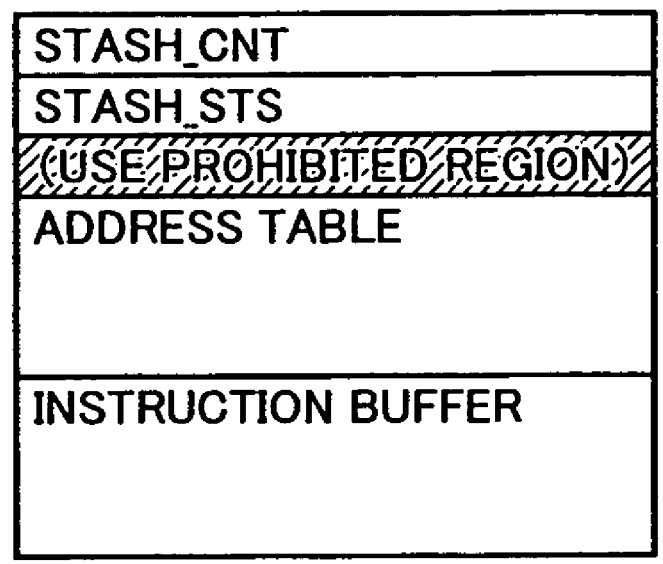
FIG. 3 is a memory map in the case where a CPU core accesses the semiconductor memory device as a memory mapped device.

FIG. 3 is a memory map in the case where CPU core 2 accesses semiconductor memory device 1 as a memory mapped device. A control register "STASH_STS" is a register which indicates the operation state (active/inactive) of semiconductor memory device 1. A control register "STASH_CNT" is a register which sets the operation state of semiconductor memory device 1.

In the memory map shown in FIG. 3, address spaces shown as "address table" and "instruction buffer" are maps of instruction buffer 13 and address table 11 shown in FIG. 2. In this embodiment, each address space is a 4-K byte region.

In these address spaces, data or instructions are readable/writable only when semiconductor memory device 1 is inactive. By setting a value in control register "STASH_CNT", these address spaces can be turned into inactive states or active states. In the case where semiconductor memory device 1 is inactive, then, determination unit 12 does not operate, semiconductor memory device 1 is bypassed, and CPU core 2 is directly connected to instruction cache 3.

Maximum value 112 is set at 0x4000_1000 address and minimum value 113 is set at 0x4000_1004 address in address table 11. Right after semiconductor memory device 1 is reset, address table 11 is initialized to "0". When a value other than "0" is set to address table 11, valid bit region 111 of address table 11 is automatically set.

Figure 4:
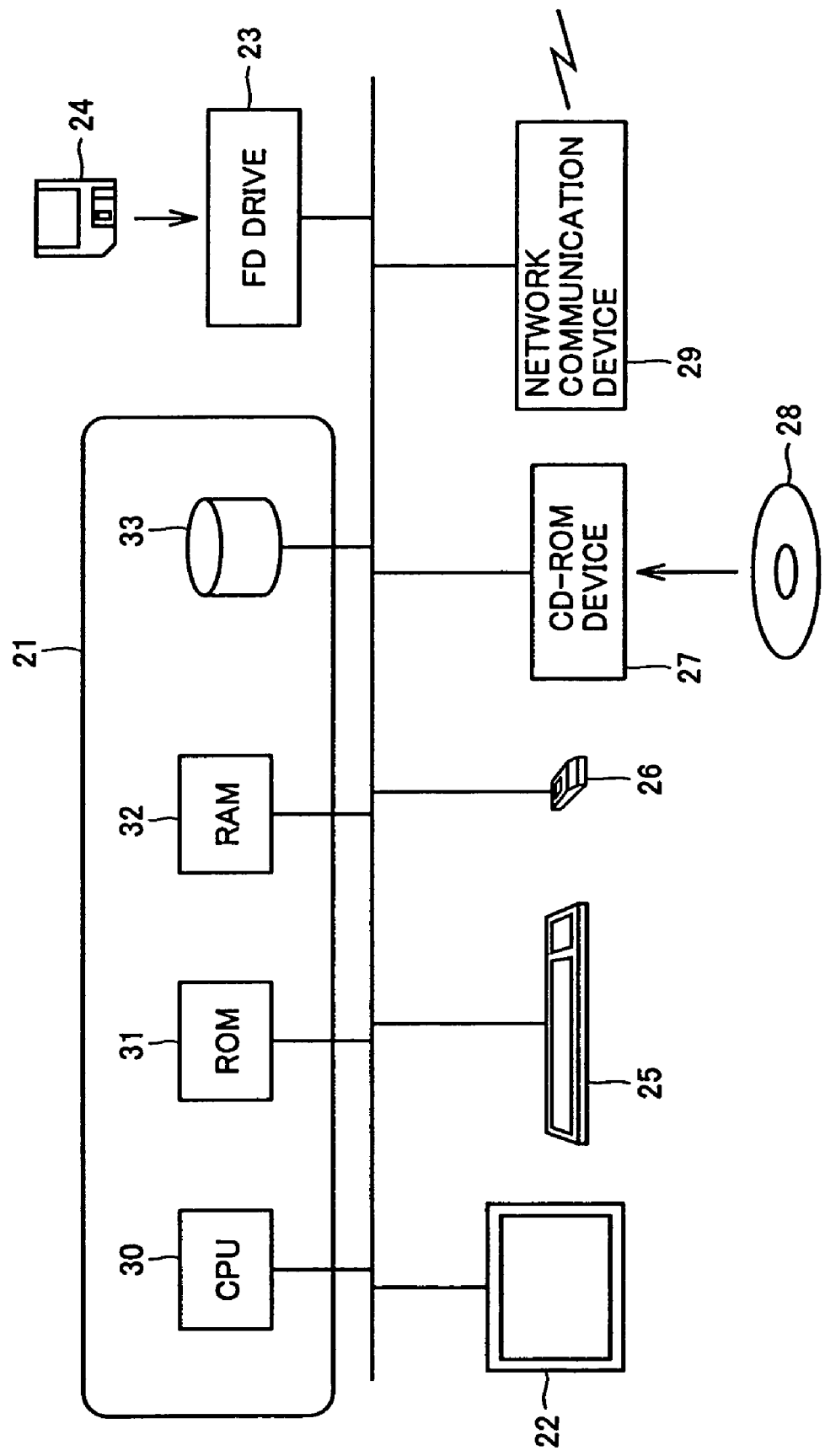
FIG. 4 is a block diagram showing a configuration of a software development apparatus for a processor system which employs the semiconductor memory device according to the first embodiment of the present invention.

FIG. 4 is a block diagram showing the configuration of a software development apparatus for a processor system which uses semiconductor memory device 1 according to the first embodiment of the present. This software development apparatus includes a computer main body 21, a display unit 22, an FD (Flexible Disk) drive 23 to which an FD 24 is attached, a keyboard 25, a mouse 26, a CD-ROM (Compact Disk-Read Only Memory) device 27 to which a CD-ROM 28 is attached, and a network communication device 29.

A program for realizing the software development apparatus (hereinafter, which program will be referred to as "software development program") is supplied by a recording medium such as FD 24 or CD-ROM 28. By allowing computer main body 21 to perform the software development program, software development is carried out. Alternatively, the software development program may be supplied to computer main body 21 from another computer via network communication device 29.

Computer main body 21 includes a CPU 30, a ROM (Read Only Memory) 31, a RAM (Random Access Memory) 32, and a hard disk 33. CPU 30 performs processings while inputting and outputting data to and from display unit 22, FD drive 23, keyboard 25, mouse 26, CD-ROM device 27, network communication device 29, ROM 31, RAM 32 or hard disk 33. The software development program recorded on either FD 24 or CD-ROM 28 is stored in hard disk 33 by CPU 30 through FD drive 23 or CD-ROM device 27. CPU 30 appropriately loads the software development program from hard disk 33 to RAM 32 and performs the program, thereby carrying out the software development.

Figure 5:
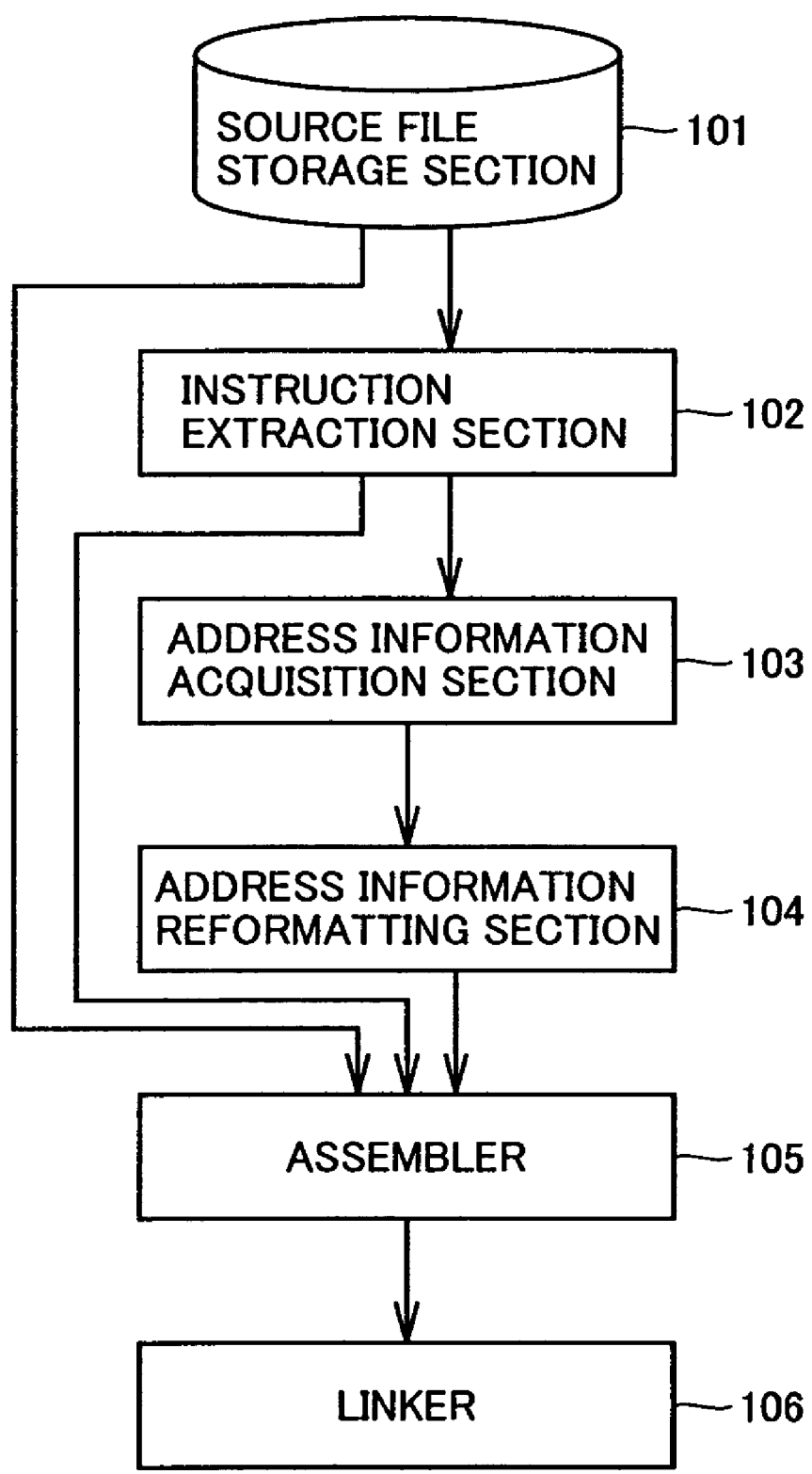
FIG. 5 is a block diagram showing a functional configuration of the software development apparatus according to the first embodiment of the present invention.

FIG. 5 is a block diagram showing a functional configuration of the software development apparatus according to the first embodiment of the present invention. This software development apparatus includes: a source file storage section 101 which stores a source file (assembler source); an instruction extraction section 102 which extracts consecutive instructions (program) arranged in semiconductor memory device 1; an address information acquisition section 103 which acquires address information on which the consecutive instructions extracted by instruction extraction section 102 is originally mapped; an address information reformatting section 104 which reformats the address information acquired by address information acquisition section 103 into a form compatible with an assembler source; an assembler 105; and a linker 106.

Figure 6:
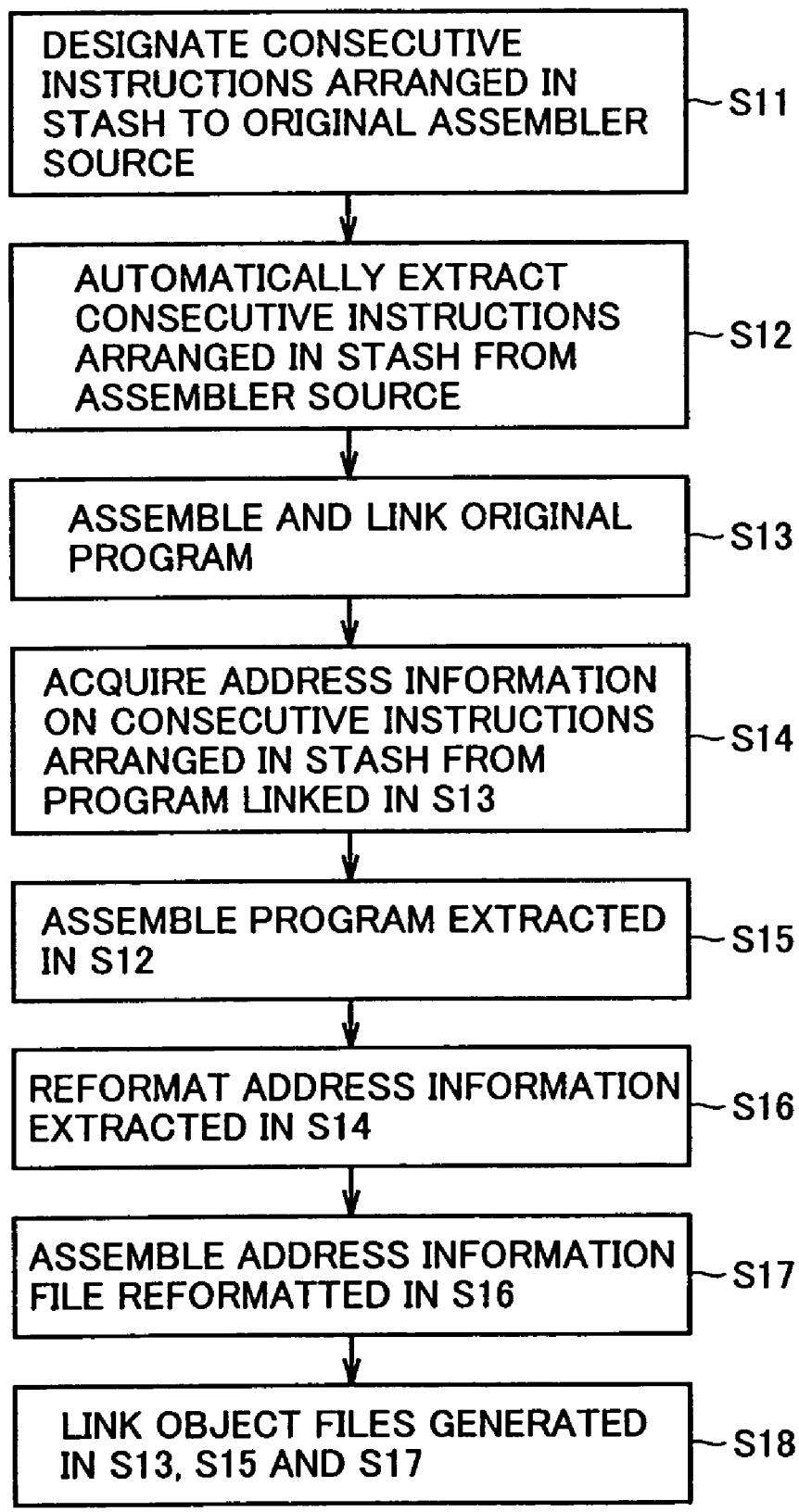
FIG. 6 is a flow chart for describing the processing procedures of the software development apparatus according to the first embodiment of the present invention.

FIG. 6 is a flow chart for describing the processing procedures of the software development apparatus according to the first embodiment of the present invention. In FIG. 6, it is assumed to carry out program development using an assembly language. First, a programmer designates the location of a program to be arranged in semiconductor memory device 1 (S11).

FIG. 7A shows part of the program performed by CPU core 2. The location of the program arranged in semiconductor memory device 1 is indicated by a portion surrounded by "_stash1_top" and "_stash1_end" in a function "_func1". Herein, "_stash1_top" and "_stash1_end" indicate reserved symbols.

Next, instruction extraction section 102 extracts, as a script program, the program arranged in semiconductor memory device 1 from the assembler source stored in source file storage section 101 (S12).

FIG. 7B shows one example of the program extracted by instruction extraction section 102. Part of the program between "_stash1_top" and "_stash1_end" is extracted.

Next, assembler 105 assembles the original program stored in source file storage section 101. Linker 106 links the original program assembled by assembler 105 (S13). Since the assembly and link are similar to those for ordinary software development using an assembly language, they will not be described herein in detail. It is noted that linker 106 links the program so that the program can be linked again for processings to be described later.

Address information acquisition section 103 acquires the address information on which the consecutive instructions arranged in semiconductor memory device 1 are originally mapped, from the original program linked by linker 106 (S14). Specifically, address information acquisition section 103 acquires the address information on reserved symbols "_stash1_top" and "_stash1_end" by disassembling the program linked by linker 106 or extracting map information.

Assembler 105 assembles the consecutive instructions extracted by instruction extraction section 102 (S15). This assembly is similar to the assembly of a program described in an ordinary assemble language, it will not be described herein in detail.

Address information reformatting section 104 reformats the address information acquired by address information acquisition section 103 into a form compatible with the assembler source (S16). FIG. 7C shows the address information reformatted by address information reformatting section 104. As shown FIG. 7C, the top address and end address of the program arranged in semiconductor memory device 1 are described on the second line.

Next, assembler 105 assembles the address information reformatted by address information reformatting section 104 (S17). Since this assembly is similar to the assembly of the program described in the ordinary assemble language, it will not be described herein in detail.

Finally, linker 106 links object files generated in steps S13, S15 and S17 with one another, and generates a load module (S18). FIG. 7D shows part of the disassemble result of the module linked by linker 106. As shown in FIG. 7D, the consecutive instructions arranged in semiconductor memory device 1 and the address information corresponding to the consecutive instructions are stored in regions starting at address 0x4000200 and at address 0x40001000, respectively.

Figure 8A:
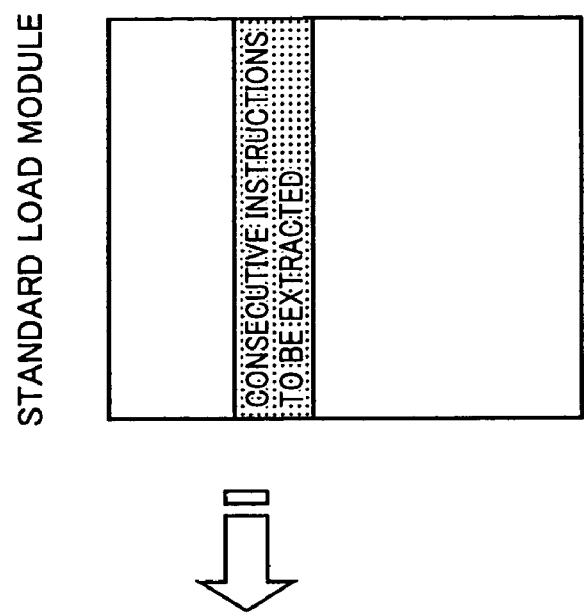
FIGS. 8A to 8C show an operation of the software development apparatus according to the first embodiment of the present invention as the memory images of the program to be performed.
Figure 8B:
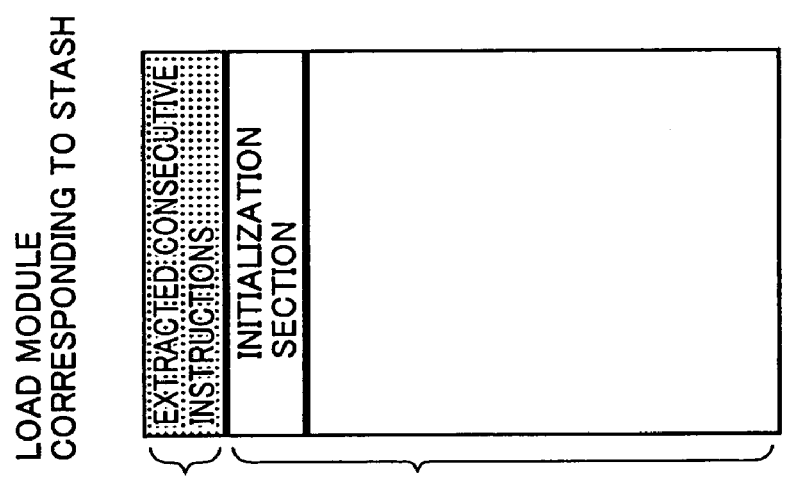
Figure 8C:
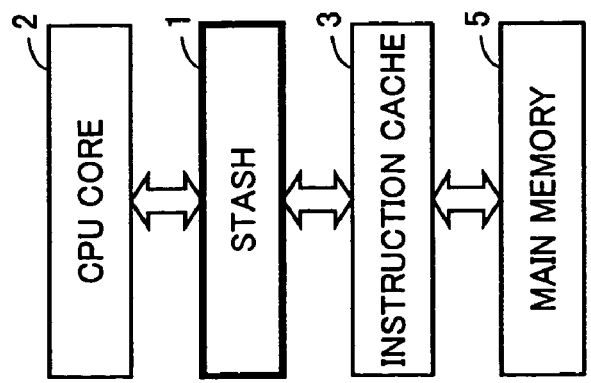

FIGS. 8A to 8C show the operation of the software development apparatus according to the first embodiment of the present invention as the memory images of the program to be performed. FIG. 8A shows the memory image corresponding to a load module generated by using a standard development tool.

FIG. 8B shows the memory image corresponding to the load module generated by the software development apparatus in this embodiment. The consecutive instructions extracted by instruction extraction section 102 (extracted consecutive instructions) are linked with an initialization section. The extracted consecutive instructions are set into semiconductor memory device 1 as shown in FIG. 8C by allowing the program included in the initialization section to be performed by CPU core 2. While the initialization section is linked with the load module, a function corresponding to the load module can be also realized by the loader of an OS (Operating System).

As described above, according to the semiconductor memory device of this embodiment, part of the consecutive instructions performed by CPU core 2 are stored in instruction buffer 13, and CPU core 2 fetches the consecutive instructions stored in instruction buffer 13. By storing the consecutive instructions which are frequently executed in instruction buffer 13, it is possible to decrease the frequency of replacement of the instruction cache to thereby decrease the number of execution cycles, and to improve CPU processing performance. In addition, since it is possible to decrease the frequency of access to the instruction cache, it is possible to improve power efficiency.

Furthermore, since semiconductor memory device 1 also acts as a memory mapped device, even a general CPU core can perform read/write of resources, operation mode setting, and the like.

Moreover, the operation mode is set so that when the possibility of access to semiconductor memory device 1 is low, semiconductor memory device 1 is bypassed and CPU core 2 is directly connected to instruction cache 3. With this configuration, it is possible to suppress the power consumption of semiconductor memory device 1. As a result, it is possible to decrease an increase in power consumption which may occur when semiconductor memory device 1 is introduced. In addition, the rewrite (including initialization) of the content of instruction buffer 3 can be carried out only when semiconductor memory device 1 is inactive. Therefore, exclusive control accompanying the resource rewrite can be realized without adding a new mechanism.

Moreover, in supplying the instruction address to instruction buffer 13 or instruction cache 3, the supply of the instruction address to the unnecessary buffer or cache is stopped. It is thereby possible to suppress the unnecessary state transition of the memory by the change of the address bus and to decrease power consumption.

Further, according to the software development apparatus in this embodiment, the software corresponding to semiconductor memory device 1 in this embodiment can be developed only by adding the function of extracting the consecutive instructions arranged in semiconductor memory device 1 to an existing software development tool. In other words, it is possible to realize the software development apparatus in this embodiment only by the simple extension of the existing software development tool.

The processor system which employs semiconductor memory device 1 in this embodiment is guaranteed of the access cycle for semiconductor memory device 1. Therefore, by allowing a software programmer to use the software development apparatus in this embodiment, it is possible to develop software having high real-time characteristics.

Additionally, the software development apparatus in this embodiment can be realized only by utilizing a standard tool chain including the assembler and the linker and adding several filter programs. It is, therefore, possible to easily create a software development program. Accordingly, it is possible to easily utilize the functions of semiconductor memory device 1 in this embodiment.

Second Embodiment

A configuration of a software development apparatus according to a second embodiment of the present invention is similar to that of the software development apparatus according to the first embodiment shown in FIG. 4. Therefore, repetitive constituent elements and functions of the apparatus will not be repeatedly described herein in detail.

Figure 9:
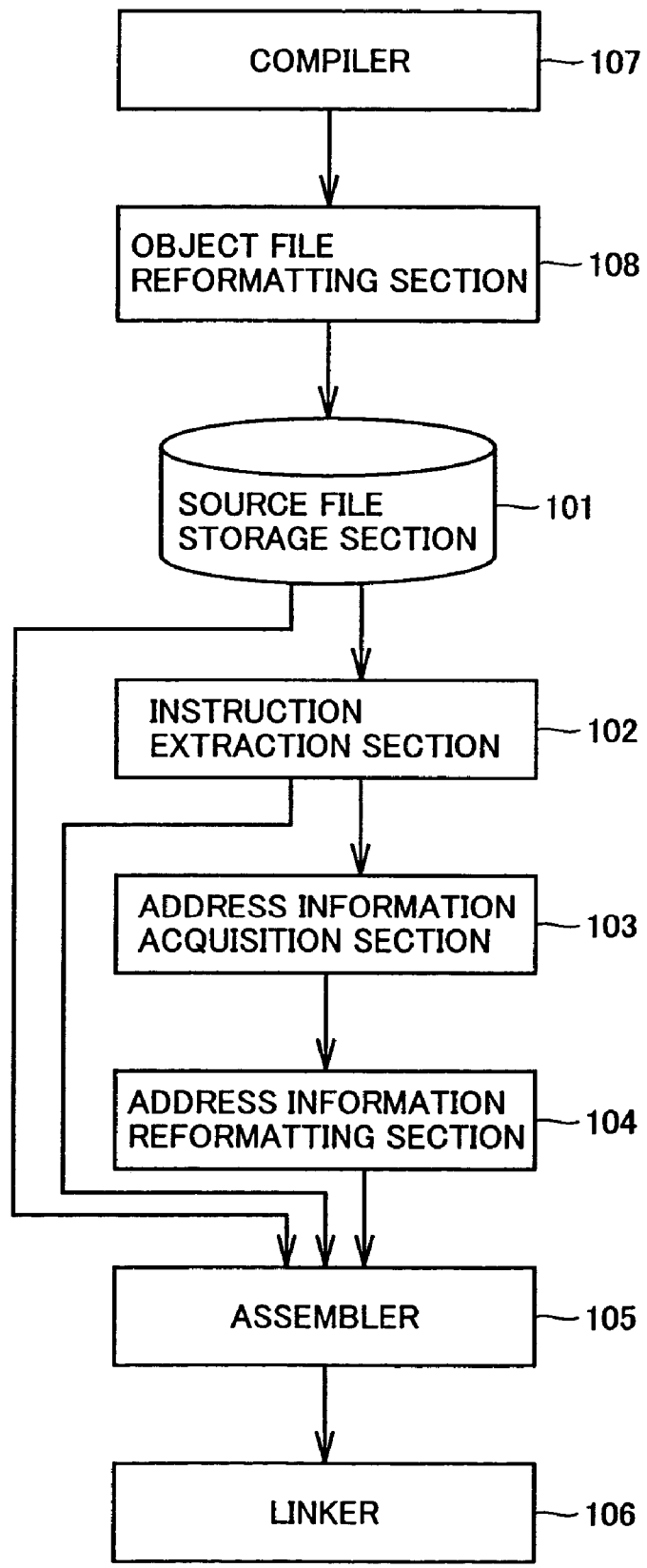
FIG. 9 is a block diagram showing a functional configuration of a software development apparatus according to a second embodiment of the present invention.

FIG. 9 is a block diagram showing a functional configuration of the software development apparatus according to the second embodiment of the present invention. The software development apparatus shown in FIG. 9 differs from that shown in FIG. 5 only in that a compiler 107 and an object file reformatting section 108 which converts and reformats an object file generated by compiler 107 into a form of the assembler source. The repetitive constituent elements and functions of the apparatus will not be, therefore, described herein in detail.

Figures 10, 11:
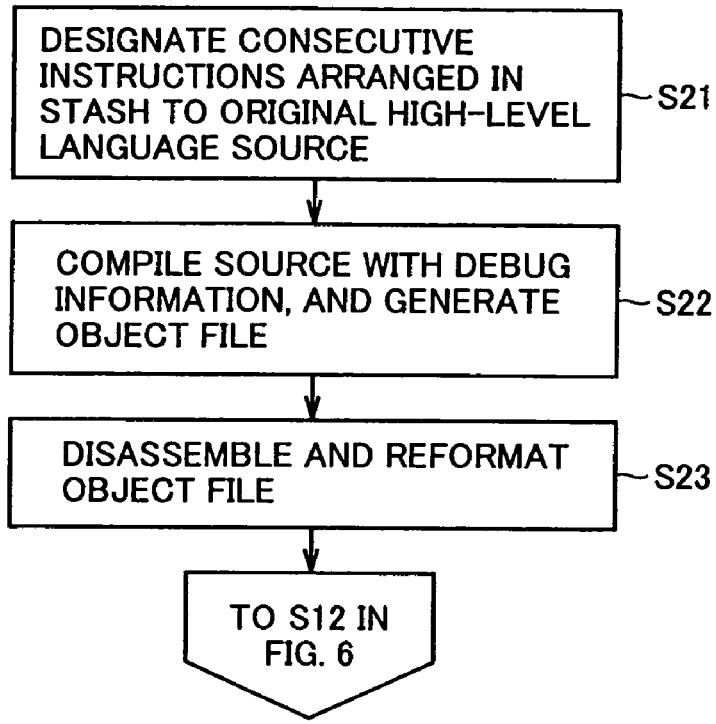
FIG. 10 is a flow chart for describing the processing procedures of the software development apparatus according to the second embodiment of the present invention.
FIG. 11 shows part of a program arranged in the semiconductor memory device in software development using C language.

FIG. 10 is a flow chart for describing the processing procedures of the software development apparatus according to the second embodiment of the present invention. Among the processing procedures of the software development apparatus in this embodiment, step S11 in the flow chart shown in FIG. 6 is replaced by steps S21 to S23 shown in FIG. 10. Therefore, the repetitive processing procedures will not be described herein in detail. In this embodiment, it is assumed to carry out program development using a high-level language such as C language.

First, a programmer designates, from an original source file in the high-level language, the location of a program to be arranged in semiconductor memory device 1 (S21).

FIG. 11 shows part of the program arranged in semiconductor memory device 1 in the software development using the C language. The location of the program to be arranged in semiconductor memory device 1 is indicated by a portion surrounded by "#pragma_stash1_top" and "#pragma_stash1_end". Herein, "#pragma_stash1_top" and "#pragma_stash1_end" indicate reserved control character strings.

Next, compiler 107 compiles the high-level language program and generates an object file (S22). Since this compiling is similar to that in ordinary software development using a high-level language, it will not be described herein in detail.

Object file reformatting section 108 disassembles the object file generated by compiler 107 together with source line information. The disassembly result, which includes information corresponding to the assembly language-level program generated by compiler 107, can be converted into the form of the assembler source shown in FIG. 7A (S23). The assembler source thus reformatted and generated is subjected to the processings in step S12 and the following steps shown in FIG. 6.

As described above, according to the software development apparatus in this embodiment, the high-level language program is compiled to generate the object file and, then, the object file is disassembled and reformatted. Therefore, in addition to the advantages described in the first embodiment of the present invention, it is possible to carry out software development corresponding to the processor system which uses semiconductor memory device 1 by even the program using a high-level language.

Third Embodiment

A semiconductor memory device according to a third embodiment of the present invention can arrange two sets of programs therein. Since a semiconductor memory device which arranges therein three or more sets of programs can be easily estimated from the semiconductor memory device in this embodiment, it will not be described herein in detail.

Figures 12, 13:
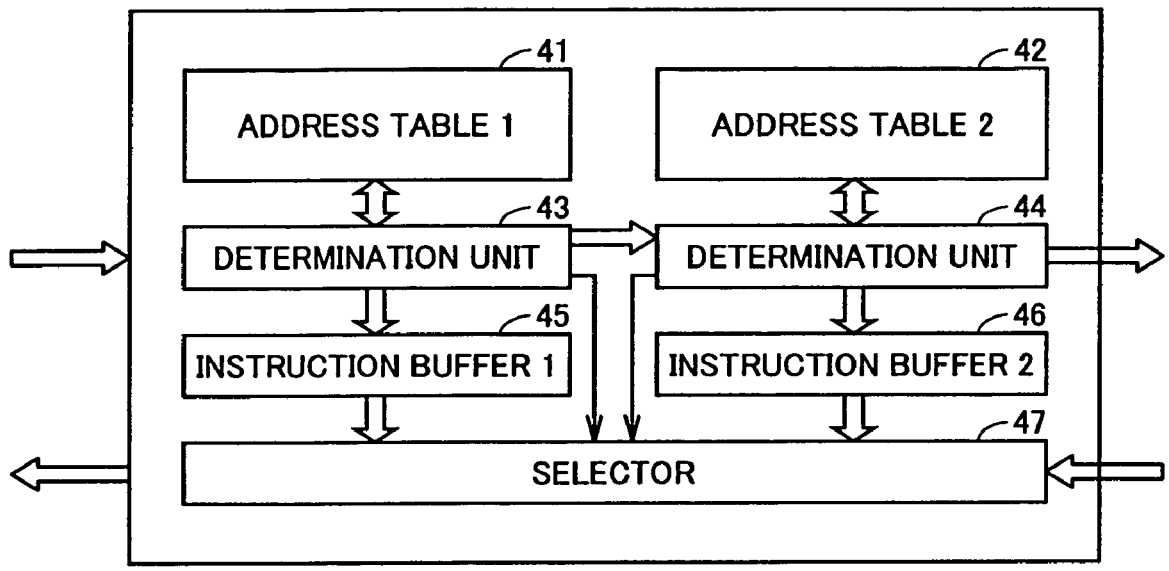
FIG. 12 is a schematic block diagram of a semiconductor memory device according to a third embodiment of the present invention.
FIG. 13 is a memory map in the case where a CPU core accesses the semiconductor memory device as a memory mapped device.

FIG. 12 is a block diagram showing a schematic configuration of the semiconductor memory device according to the third embodiment of the present invention. Semiconductor memory device 1a includes an address table 1 (41), an address table 2 (42), determination units 43 and 44, an instruction buffer 1 (45), an instruction buffer 2 (46), and a selector 47.

Address table 1 (41) and address table 2 (42) are equal in configuration and function to address table 11 shown in FIG. 2. Determination units 43 and 44 are equal in configuration and function to determination unit 12 shown in FIG. 2. In addition, instruction buffer 1 (45) and instruction buffer 2 (46) are equal in configuration and function to instruction buffer 13 shown in FIG. 2.

In the case where an instruction address outputted from CPU core 2 hits on an address stored in address table 1 (41), selector 47 selects an instruction code outputted from instruction buffer 1 (45) and outputs the selected instruction code to CPU core 2. In the case where the instruction address outputted from CPU core 2 hits on an address stored in address table 2 (42), selector 47 selects an instruction code outputted from instruction buffer 2 (46) and outputs the selected instruction code to CPU core 2. Further, in the case where the instruction address outputted from CPU core 2 does not hit on either an address stored in address table 1 (41) or an address stored in address table 2 (42), selector 47 selects an instruction code outputted from instruction cache 3 and outputs the selected instruction code to CPU core 2.

FIG. 13 is a memory map in the case where CPU core 2 accesses semiconductor memory device 1a as a memory mapped device. The memory map shown in FIG. 13 differs from that shown in FIG. 3 only in that two "address tables" and two "instruction buffers" are mapped and each table or buffer is a 4-K byte region.

Figure 14:
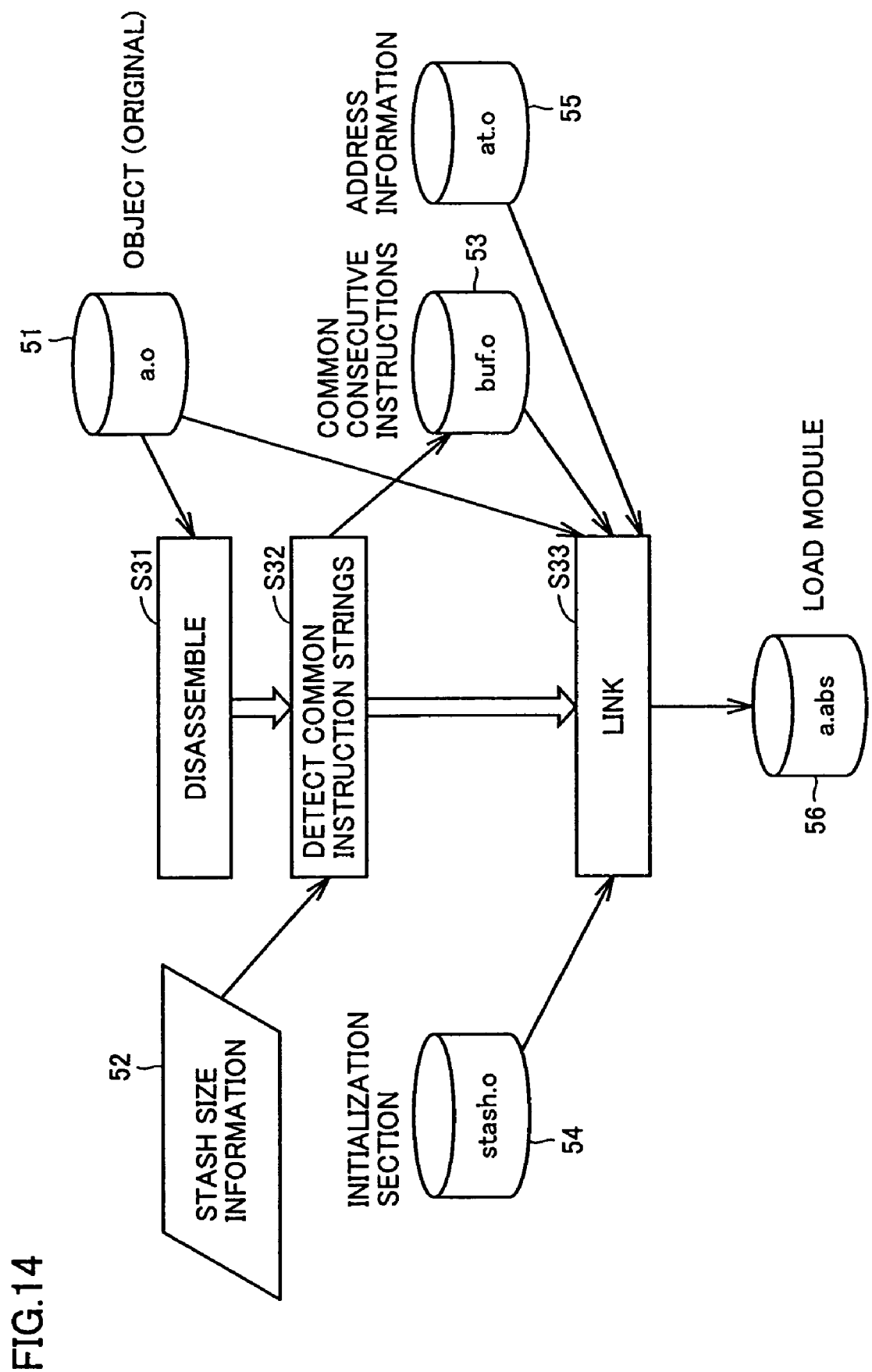
FIG. 14 is a flow chart for describing the processing procedures of a software development apparatus according to the third embodiment of the present invention.

FIG. 14 is a flow chart for describing the processing procedures of the software development apparatus according to the third embodiment of the present invention. First, a disassembler disassembles an object file (a.o) 51 of a software performed by a processor system including semiconductor memory device 1a in this embodiment (S31).

Next, common consecutive instructions which appear in a plurality of locations are detected from the source file generated by the disassembler (S32). The detected common consecutive instructions and address information related to the common consecutive instructions are assembled, and object files (buf.o, at.o) 53 and 55 are generated, respectively.

Finally, generated object files (buf.o, at.o) 53 and 55 are linked with original object file (a.o) 51 and a routine (stash.o) 54 for initializing semiconductor memory device 1, thereby generating a load module (a.abs) 56. It is noted that the software development tool of target CPU core 2 can be utilized as the disassembler and the linker as it is.

In addition, to detect the common consecutive instructions, hardware configuration information such as size information 52 on target semiconductor memory device 1 is used as parameters, and the common consecutive instructions with such a size as to be able to be stored in semiconductor memory device 1 are extracted from instruction patterns which repeatedly appear. The extracted common consecutive instructions are arranged in instruction buffer 1 (45) and instruction buffer 2 (46), respectively.

As described above, according to semiconductor memory device 1 in this embodiment, a plurality of common consecutive instructions can be arranged in semiconductor memory device 1. Therefore, it is possible to attain the same advantages as those described in the first embodiment in relation to the common program part which performs the same operation, and to improve the versatility of semiconductor memory device 1.

Fourth Embodiment

A semiconductor memory device according to a fourth embodiment of the present invention differs from the semiconductor memory device in the first embodiment shown in FIG. 2 only by the configuration and function of the determination unit. Therefore, the repetitive configurations and functions of the semiconductor memory device in this embodiment will not be described herein in detail. The determination unit in this embodiment will be described while being denoted by reference symbol 12'.

Figure 15:
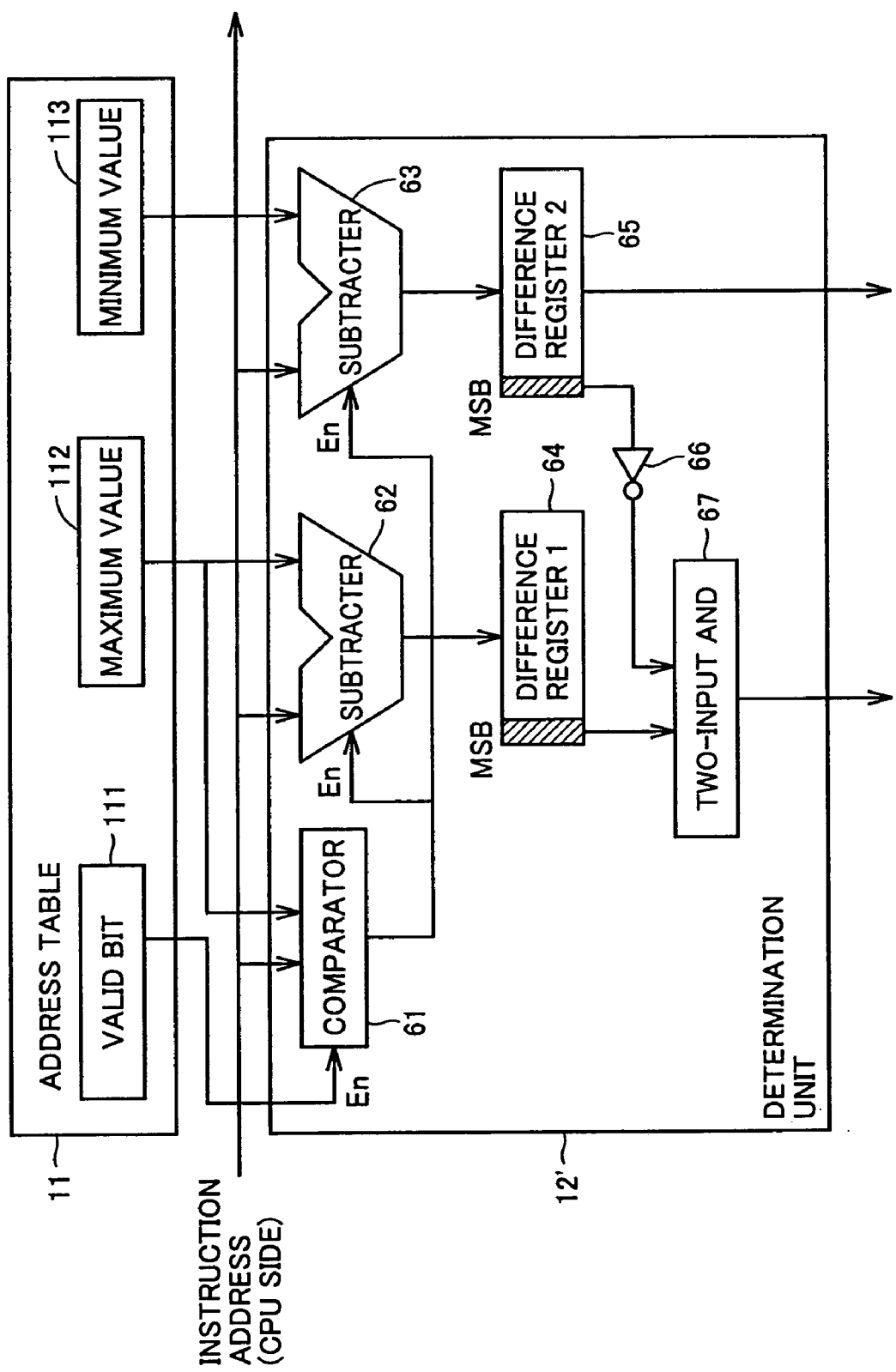
FIG. 15 is a block diagram showing a configuration of a determination unit according to a fourth embodiment of the present invention.

FIG. 15 is a block diagram showing a configuration of determination unit 12' according to the fourth embodiment of the present invention. Determination unit 12' includes a comparator 61, subtracters 62 and 63, a difference register 1 (64) which stores the subtraction result of subtracter 62, a difference register 2 (65) which stores the subtraction result of subtracter 63, an inverter 66, and a two-input AND circuit 67.

In the case where a value is set in valid bit region 111, comparator 61 compares upper 19 bits of an address outputted from CPU core 2 with upper 19 bits of a maximum value of the address stored in region 112. In the case where the both upper 19 bits of the addresses coincide with one another, comparator 61 enables subtracters 62 and 63. In the case where they do not coincide one another, comparator 61 disables subtracters 62 and 63.

Subtracter 62 subtracts lower 13 bits of the maximum value of the address stored in region 112 from lower 13 bits of the address outputted from CPU core 2, and stores the subtraction result in difference register 1 (64). Subtracter 63 subtracts lower 13 bits of a minimum value of the address stored in region 113 from lower 13 bits of the address outputted from CPU core 2, and stores the subtraction result in difference register 2 (65).

AND circuit 67 performs an AND operation between the sign bit of difference register 1 (64) and the inverted value of the sign bit of difference register 2 (65), thereby determining whether or not the lower 13 bits of the address outputted from CPU core 2 fall within a predetermined range. In the case of determining that the lower 13 bits of the instruction address hit, AND circuit 67 outputs H level.

As described above, according to semiconductor memory device 1 in this embodiment, comparator 61 compares the upper 19 bits of the address outputted from CPU core 2 with the upper 19 bits of the maximum address stored in region 112, and controls subtracters 62 and 63 in accordance with the comparison result. It is therefore possible to decrease the number of bits of subtracters 62 and 63, difference register 1 (64) and difference register 2 (65), to thereby decrease the circuit scale of determination unit 12' and to decrease the power consumption of semiconductor memory device 1.

Fifth Embodiment

A semiconductor memory device according to a fifth embodiment of the present invention differs from the semiconductor memory device according to the first embodiment shown in FIG. 2 only by the configuration and function of the determination unit. Therefore, the repetitive configurations and functions of the semiconductor memory device in this embodiment will not be described herein in detail. The determination unit in this embodiment will be described while being denoted by reference symbol 12".

Figure 16:
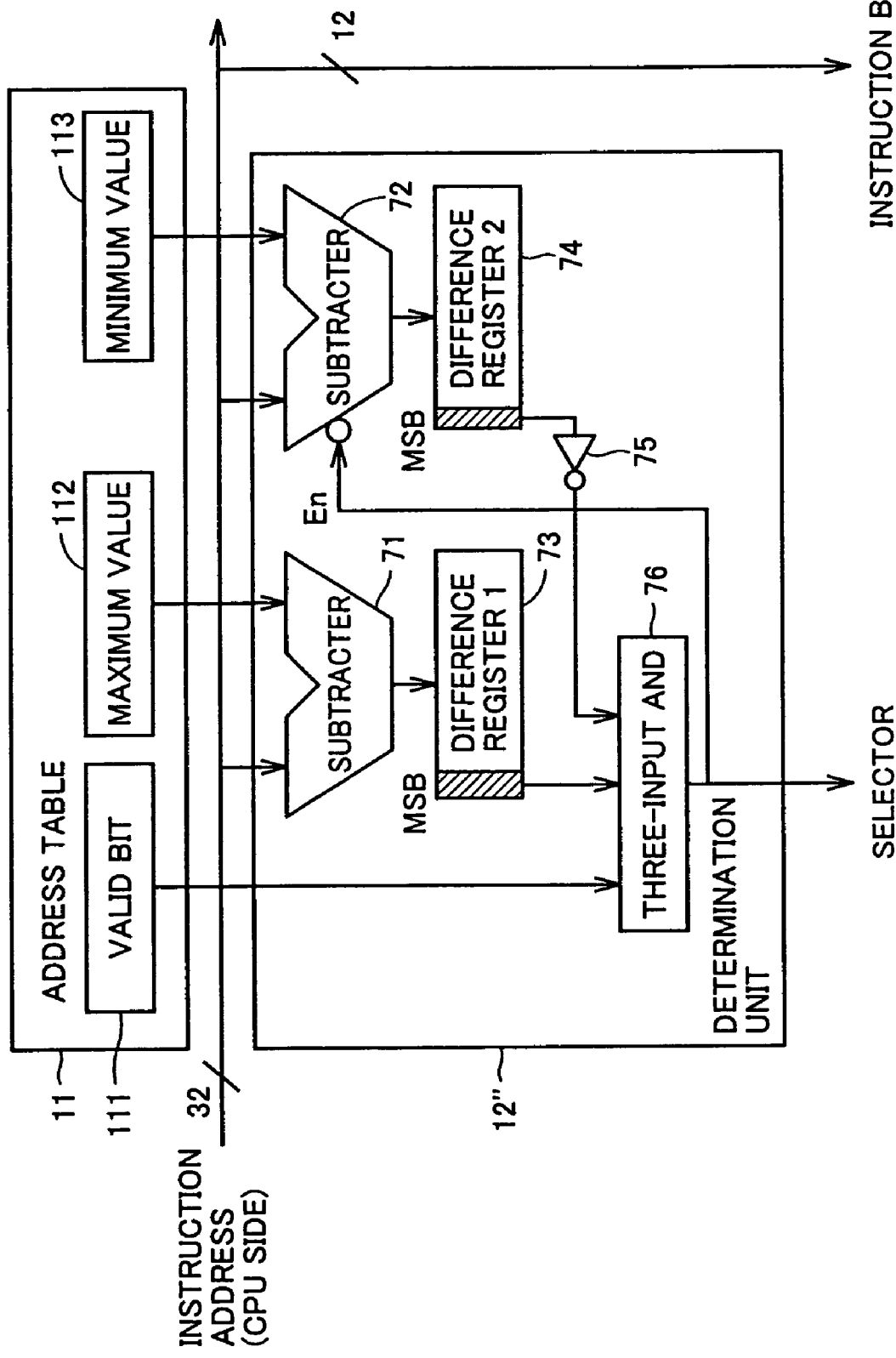
FIG. 16 is a block diagram showing a configuration of a determination unit according to a fifth embodiment of the present invention.

FIG. 16 is a block diagram showing a configuration of determination unit 12" according to the fifth embodiment of the present invention. Determination unit 12" includes subtracters 71 and 72, a difference register 1 (73) which stores the subtraction result of subtracter 71, a difference register 2 (74) which stores the subtraction result of subtracter 72, an inverter 75, and a three-input AND circuit 76.

In this embodiment, a program arranged in instruction buffer 13 is limited into a basic block. That is, the program is limited so that consecutive instructions arranged in instruction buffer 13 do not include a branch instruction and branching to the consecutive instructions arranged in instruction buffer 13 is not performed.

By giving such a limitation to a software programmer, an instruction address is always incremented when the CPU fetches an instruction code from instruction buffer 13. In other words, once there is an instruction address hit, the value of MSB of difference register 2 (74) has no change until the next miss-hit generates. Thus, the operation of subtracter 72 which subtracts minimum value 113 from instruction address outputted from CPU core 2 is stopped until the next miss-hit generates.

AND circuit 76 performs an AND operation between the sign bit of difference register 1 (73) and the inverted value of the sign bit of difference register 2 (74), thereby determining whether or not the address outputted from CPU core 2 falls within a predetermined range. In the case of determining instruction address hit, AND circuit 76 outputs H level, and disables subtracter 72 to stop the operation of subtracter 72. In the case of determining instruction address miss-hit, AND circuit 76 outputs L level, and enables subtracter 72 to start the operation thereof.

In addition, the lower 12 bits of the instruction address outputted from CPU core 2 are supplied to instruction buffer 13.

Figure 17:
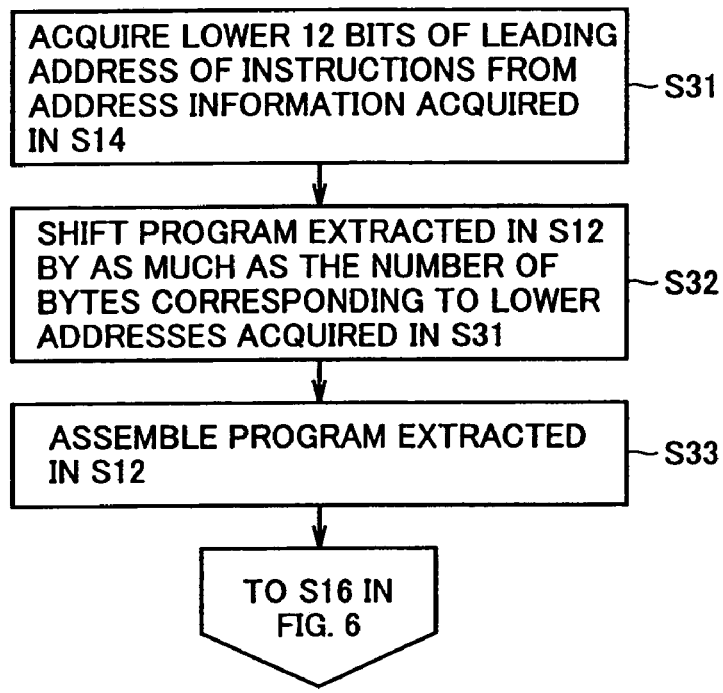
FIG. 17 is a flow chart for describing the processing procedures of a software development apparatus according to the fifth embodiment.

FIG. 17 is a flow chart for describing the processing procedures of the software development apparatus according to the fifth embodiment of the present invention. Among the processing procedures of the software development apparatus in this embodiment, step S15 in the flow chart shown in FIG. 6 is replaced by steps S31 to S33 shown in FIG. 17. Therefore, the repetitive processing procedures will not be described herein in detail.

Address information acquisition section 103 acquires the lower 12 bits of the address of a leading instruction from the address information acquired in step S14 (S31). The consecutive instructions (program) extracted by instruction extraction section 102 is shifted in instruction buffer 13 by as much as the number of bytes corresponding to the lower 12 bits of the address of the leading instruction. In this way, the lower 12 bits of the instruction addresses outputted from CPU core 2 are matched to those of the address in instruction buffer 13.

Next, assembler 105 assembles the consecutive instructions extracted by instruction extraction section 102 (S33), and moves to a processing in step S16 shown in FIG. 6.

As described above, by giving the limitation to the software programmer at the time of program creation, it is possible to facilitate determination by determination unit 12" and to stop the operation of subtracter 72 while there is instruction address hit. It is, therefore, possible to decrease the power consumption of semiconductor memory device 1.

Sixth Embodiment

A breakpoint function which is widely utilized in software debugging is normally realized by replacing an instruction corresponding to a breakpoint by an exception instruction. However, in semiconductor memory device 1 according to the first embodiment, it is impossible to rewrite instruction buffer 13 or the like while the processor system operates and to set an exception instruction into instruction buffer 13. Thus, semiconductor memory device 1 has a disadvantage of making program debugging difficult. In this embodiment, this disadvantage is solved and program debugging can be efficiently performed.

A configuration of a processor system which employs the semiconductor memory device according to the sixth embodiment of the present invention differs from a processor system which employs the semiconductor memory device according to the fifth embodiment only in that a semiconductor memory device reserved region is mapped on a memory map. Therefore, the repetitive constituent elements and functions of the semiconductor in this embodiment will not be described herein in detail.

Figure 18:
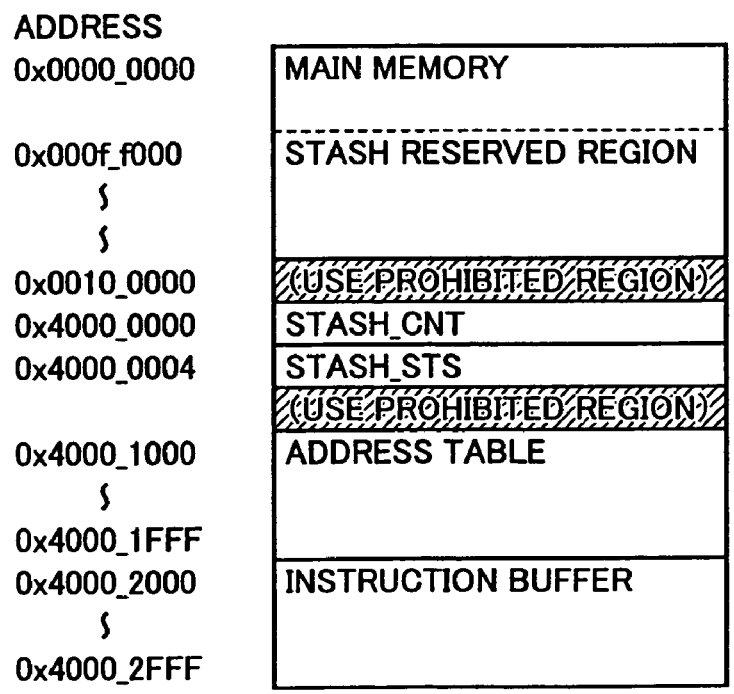
FIG. 18 shows one example of a memory map according to a sixth embodiment of the present invention.

FIG. 18 shows one example of the memory map according to the sixth embodiment of the present invention. A semiconductor memory device reserved region equal in size to instruction buffer 13 of semiconductor memory device 1 is set in main memory 5.

The processing procedures of the software development apparatus according to the sixth embodiment of the present invention are the same as those in the fifth embodiment except for the processing of step S18. Therefore, repetitive processing procedures will not be described herein in detail. In this embodiment, the processing procedures will be described while step S18 is replaced by a step S18'.

In step S18', linker 106 sets a branch instruction to a top address in the region of main memory 5 corresponding to the consecutive instructions arranged in instruction buffer 13. The destination of the branch instruction is set to a top address in the semiconductor memory device reserved region shown in FIG. 18. In addition, a branch instruction is added to the end of the consecutive instructions extracted by instruction extraction section 102 (extracted consecutive instructions) and set in the semiconductor memory device reserved region. The destination of the branch instruction is set to a location right after an end address in the region of main memory 5 corresponding to the extracted consecutive instructions.

These processing procedures will be described more specifically on the basis of on the program shown in FIGS. 7A to 7D. First, by the first half processing of step S18', the branch instruction to 0xff000 is set at address 0x264. By the second half processing thereof, the branch instruction to 0x26c is added to a location right after the extracted consecutive instructions shown in FIG. 7B, and the resultant consecutive instructions are set at address 0xff000.

In this way, when the debugging initialization section is linked, the extracted instruction main body other than the branch instruction is performed by fetching the instructions from the semiconductor memory device reserved region of main memory 5. Since this region is located on main memory 5, it is possible to set a breakpoint. In other words, if only the initialization section is utilized as a different program while leaving the program main body and the extracted consecutive instructions unchanged, it is possible to debug the software by using the algorithms of the program main body and the extracted consecutive instructions as they are.

As described above, according to the processor system in this embodiment, the semiconductor memory device reserved region is provided on main memory 5 and the extracted consecutive instructions are arranged in the semiconductor memory device reserved region. It is therefore possible to set a breakpoint, and to facilitate software debugging.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor memory device connected between a processor and an instruction cache, comprising: an instruction buffer storing part of consecutive instructions performed by the processor; an address table setting therein an address range of the part of the consecutive instructions; a determination unit determining whether an instruction address outputted from said processor fall within the address range set in said address table; and a selector selectively outputting an instruction code stored in said instruction buffer and an instruction code stored in said instruction cache in accordance with a determination result of said determination unit, wherein said address table and said instruction buffer are mapped on a memory map of said processor, and operate as a memory mapped device when an inactive mode is set.

2. A semiconductor memory device connected between a processor and an instruction cache, comprising: an instruction buffer storing part of consecutive instructions performed by the processor; an address table setting therein an address range of the part of the consecutive instructions; a determination unit determining whether an instruction address outputted from said processor fall within the address range set in said address table; and a selector selectively outputting an instruction code stored in said instruction buffer and an instruction code stored in said instruction cache in accordance with a determination result of said determination unit, wherein said determination unit includes: a first subtracter subtracting a maximum value of address set in said address table from the instruction address outputted from said processor; a second subtracter subtracting a minimum value of the address set in said address table from the instruction address outputted from said processor; and a logic circuit determining whether the instruction address outputted from said processor fall within the address range set in said address table in accordance with a sign of a subtraction result of said first subtracter and a sign of a subtraction result of said second subtracter.

3. The semiconductor memory device according to claim 2, wherein said second subtracter outputs the subtraction result to said instruction buffer as an address.

4. The semiconductor memory device according to claim 2, wherein said determination unit further includes a comparator comparing upper bits of the instruction address outputted from said processor with upper bits of the maximum value set in said address table, and stopping operations of said first subtracter and said second subtracter in the case of determining inconsistency of the upper bits.

5. The semiconductor memory device according to claim 2, wherein in the case of determining that the instruction address outputted from said processor fall within the address range set in said address table, said logic circuit stops an operation of said second subtracter until it is determined that the instruction address outputted from said processor is out of the address range set in said address table.

6. The semiconductor memory device according to claim 5, wherein the instruction address outputted from said processor is supplied as addresses of said instruction buffer.

* * * * *